Nov. 11, 1930.  T. BARBERA  1,781,209
DEVICE FOR MAKING DESIGNS ON CAKES AND THE LIKE
Filed March 11, 1929   3 Sheets-Sheet 1

Inventor
Tony Barbera
By Clarence A. O'Brien
Attorney

Nov. 11, 1930.   T. BARBERA   1,781,209
DEVICE FOR MAKING DESIGNS ON CAKES AND THE LIKE
Filed March 11, 1929   3 Sheets-Sheet 2
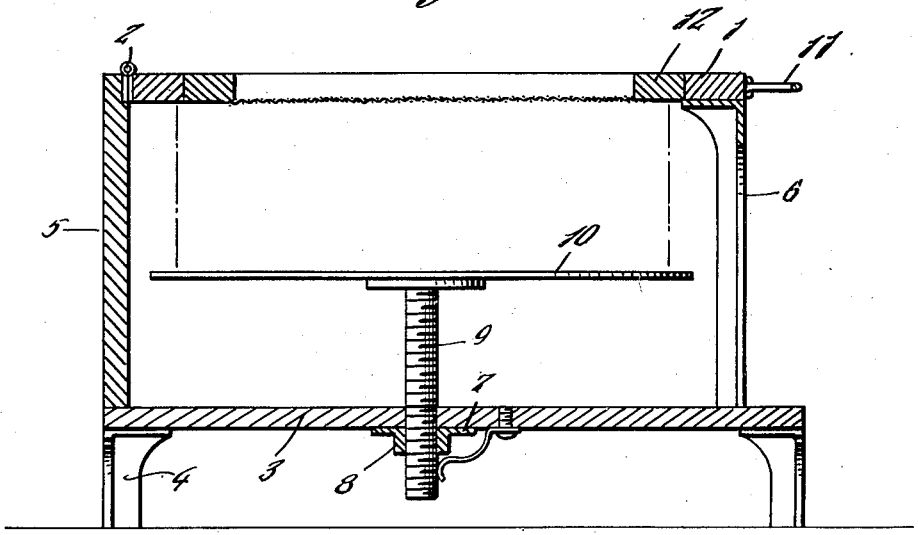
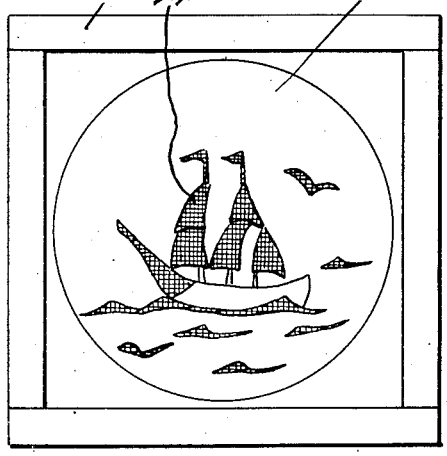
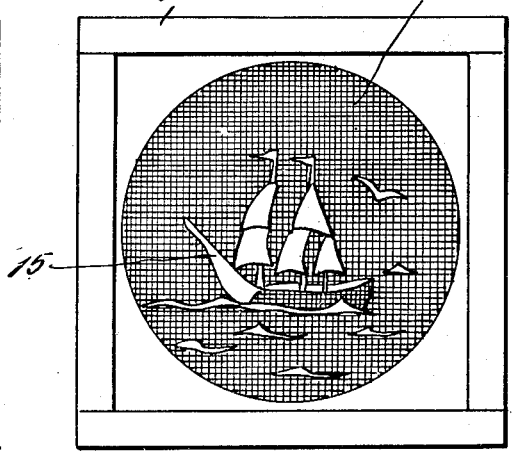
Inventor
*Tony Barbera*
By *Clarence A O'Brien*
Attorney Nov. 11, 1930.  T. BARBERA  1,781,209
DEVICE FOR MAKING DESIGNS ON CAKES AND THE LIKE
Filed March 11, 1929   3 Sheets-Sheet 3
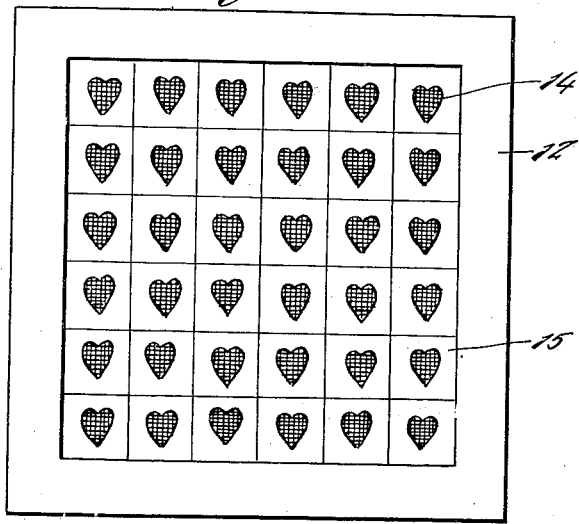
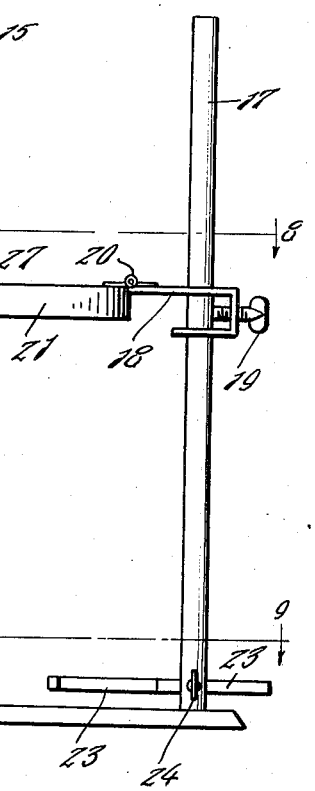
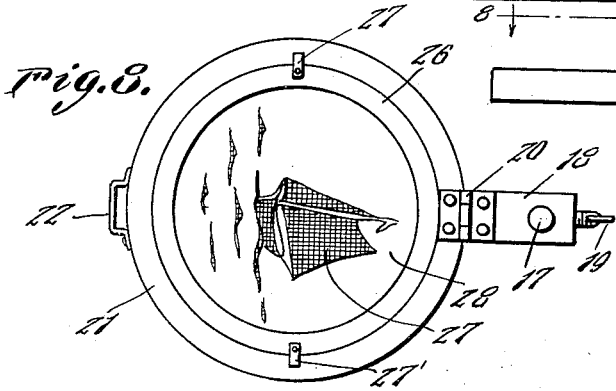
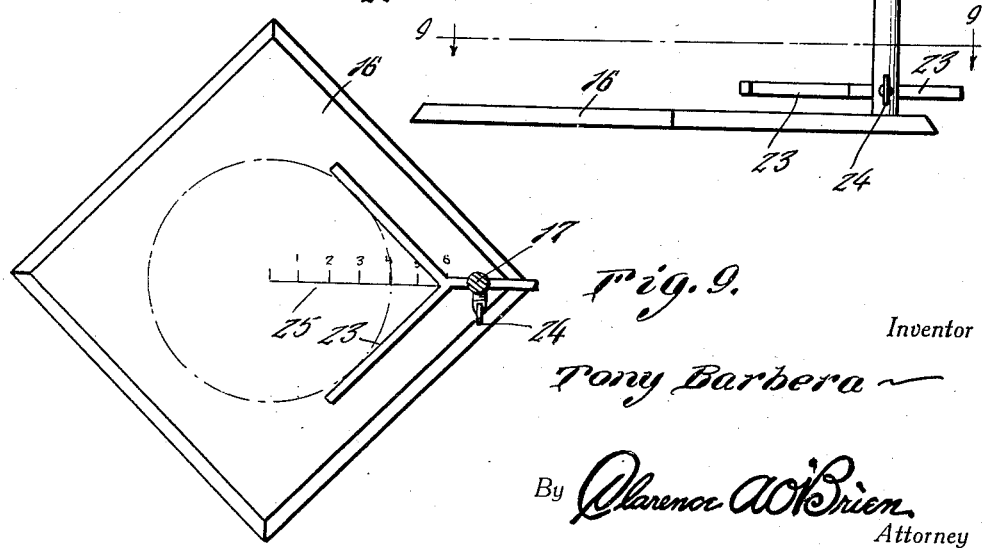
Inventor
Tony Barbera
By Clarence A. O'Brien
Attorney Patented Nov. 11, 1930

1,781,209

UNITED STATES PATENT OFFICE

TONY BARBERA, OF TRINIDAD, COLORADO, ASSIGNOR TO DESIGNOGRAPH COMPANY, OF TRINIDAD, COLORADO, A CORPORATION OF COLORADO

DEVICE FOR MAKING DESIGNS ON CAKES AND THE LIKE

Application filed March 11, 1929. Serial No. 346,048.

The present invention relates to what I term a designograph, and the purpose of the device is to paint designs, pictures, or lettering in a plurality of colors on ice cream cakes, ice cream bricks, or ice cream in slices, cookies or wafers, and in general confections of various kinds and sizes.

A very important object of the invention is to facilitate the decoration of various confections and cakes, whereby the cakes and confections may be decorated with amazing speed and accuracy even in the hands of the unskilled, thereby producing a very useful if not indispensable device of this nature.

A further object of the invention is to provide a device of the character described whereby either one large, or a plurality of individual cakes of varying size may be decorated with one or more designs appropriate for such occasions as birthday parties, card parties or other festivities.

Another very important object of the invention resides in the provision of a device of this nature which is extremely simple in its construction, easy to manipulate, compact and efficient in its arrangement of parts, strong and durable, inexpensive to manufacture, clearly efficient and reliable in use, and otherwise well adapted for the purpose for which it is designed.

With the above and numerous other objects in view as will appear as the description proceeds, the invention resides in certain novel features of construction, and in the combination and arrangement of parts that will be hereinafter more fully described and claimed.

In the drawings:

Figure 3 is a vertical section therethrough.

Figure 4 is a plan view of one screen.

Figure 5 is a plan view of another screen.

Figure 6 is a plan view of another form of screen.

Figure 7 is a side elevation of another embodiment of my device.

Figure 8 is a transverse section taken on line 8—8 of Figure 7.

Figure 9 is a transverse section taken on line 9—9 of Figure 7.

Figure 1:
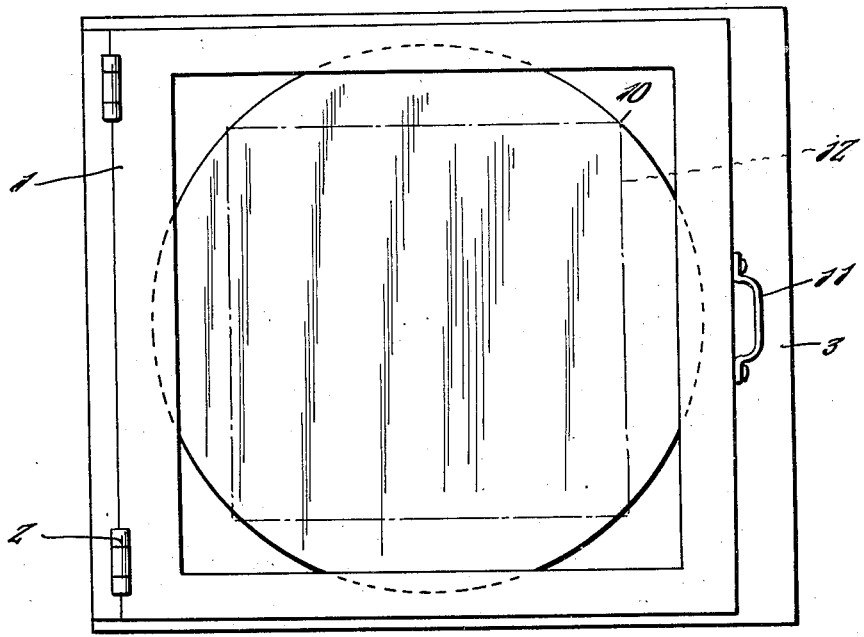
Figure 1 is a top plan view of one embodiment of my device.
Figure 2:
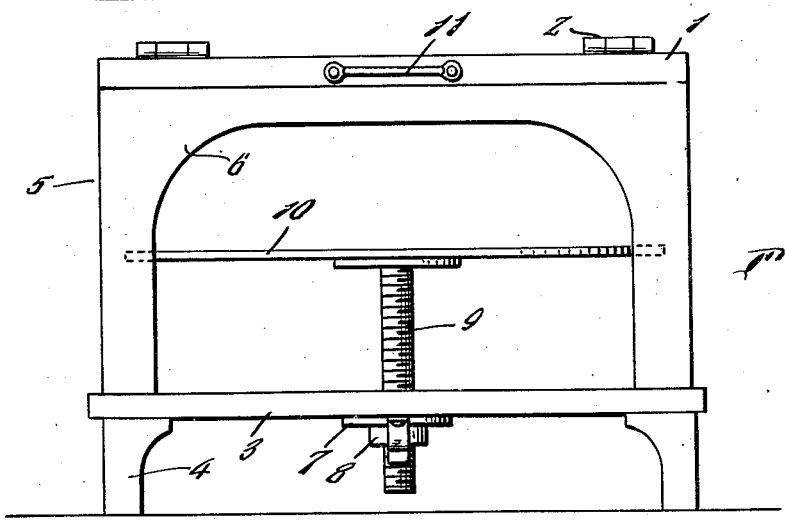
Figure 2 is a side elevation thereof.

Referring to the drawings in detail it will be seen that one embodiment of my invention as illustrated in Figures 1 to 3 inclusive comprises a frame 1 which is hingedly mounted as at 2 in a supporting structure comprising a base 3, preferably mounted on four legs 4 and having rising therefrom a plurality of walls 5 in box-like arrangement, two of which walls are preferably formed to provide a pair of opposed openings 6. A plate 7 is secured to the base and has a threaded collar 8 registering with an opening in the base to receive a threaded shank 9 which has secured to its upper end a disk 10 on which the cake or other confection is adapted to be rested. The hinges 2 are engaged with the frame 1 and with one of the walls 5, preferably one of those walls provided with openings 6. A suitable handle 11 is provided at the free end of the frame so that it may be swung to an open position. A plurality of frames 12 are provided with screens 14 therein covered as is indicated at 15 to leave blank spaces forming the desired design. It is to be noted that in Figures 4 and 5 I have provided one larger structure, having but one large design formed thereon in a manner as described, and these are intended for use when it is desired to apply a design to but a single cake or the like. In Figure 6 the screen is so covered as to provide a plurality of designs which in this case are illustrated as heart shaped, and it is proposed that such a structure be used in applying the design to a number of individual confections. The particular structure as illustrated in Figure 6 will in all likelihood be more desirable to a candy manufacturer, since it is apparent such will permit a tray full of confections to be painted in one operation.

Attention is now invited to Figures 7 and 9 wherein is illustrated what is perhaps the preferred embodiment of my invention. In the embodiment now to be described it will be seen that the same comprises a supporting base 16 having a standard 17 extending upwardly therefrom, and disposed at one corner of the base. A bracket 18 of substantially U-shaped formation is provided with openings in the legs thereof through which the post 17 extends, and upon which the bracket 18 is slidably mounted. On the bight portion of the bracket 18 there is provided a thumb screw 19 for holding the bracket in an adjusted position on the post 17. Upon one of the extreme ends of one of the legs of the bracket 18 there is hingedly mounted at 20 a circular shaped frame 21. If desired, the frame 21 may be provided with a handle 22 secured to the frame on the outer periphery thereof. A substantially Y-shaped member 23 projects laterally from the lower end of the post 17 and is adapted to slide transversely of the post through an opening formed in the lower end of the post and spaced from the supporting base 16 for holding the member 23 above the base. A thumb screw 24 is threadedly mounted in the post and adjacent the opening for contact with the member 23 for holding the same in an adjusted position. The supporting base 16 may if desired be provided with a graduated scale 25 to be used in conjunction with the member 23 to provide an accurate centering device for the cake or confection when placed on the base 16.

In Figure 3 I have shown a circular frame 26 provided with diametrically disposed projections 27, which projections rest upon the top edge of the frame 21, when the frame 26 is inserted therein. The frame 26 is also provided with a wire screen 27 disposed therein and covered as is indicated at 28 to leave blank spaces forming the desired design. Of course it is to be understood that instead of using the frame 21 a frame which is square, or any geometrical shape may be fastened to the bracket 18 by means of the hinge 20.

When using that embodiment of my invention as illustrated in Figure 7 the cake or confection to be decorated is placed on the supporting base 16 and accurately centered by means of the member 23 in conjunction with the graduated scale 25 in a manner quite apparent. The frame 21 and bracket 18 has been moved downwardly so that the desired design carried in the same over the cake so as to touch the top surface of the cake, the frame and bracket being held in place for tightening the thumb screw 19.

My method of attaining designs is to spray food colors of thin consistency through the screen onto the surface of the cake or other confection, and multicolor effects may be obtained by first using one screen such as is shown in Figure 5 for instance, and in using a second screen such as is shown in Figure 4 with a different color. These devices shown in Figures 4, 5, and 6, of course, form stencils, and are of a size to permit them to fit in either the frame 1 or the frame 21 as will be very apparent. The parts of the stencils where the coloring material is to go through are left open, while the rest is closed.

It is apparent that this apparatus may be used on large or individual size cakes, to be used for different parties with designs appropriate for each occasion, such as a birthday party, card party, and other festival occasions. It may be used for advertising purposes. The advertiser's name or trade-mark or slogan may be easily and quickly printed.

From the above description will be seen the possibilities of using this device in either of its embodiments for coloring purposes on various confections, ice cream and dainties. It is to be understood of course that each succeeding stencil is made to cover a different area on the cake or confection, thus protecting the surface previously colored, or area which should not be colored with that particular color, since the openings are formed in each stencil so as to permit the color through only where it is desired to color a certain area on the cake with that particular color. It is therefore seen that a separate screen is required for each color. Thus it will be seen that an unlimited number of designs by such an operation and capable of producing designs appropriate for such events as Lincoln's or Washington's Birthday, Valentine Day, Halloween, and other such festival occasions.

It is thought that the construction, utility, operation and advantages of this invention will be quite apparent to those skilled in this art without a more detailed description thereof.

The present embodiment of the invention has been disclosed in considerable detail merely for the purpose of exemplification, and in actual practice it attains the features of advantage enumerated as desirable in the statement of the invention of the above description. It will be apparent that numerous changes in the details of construction, combination and arrangment of parts may be resorted to without departing from the spirit and scope of the appended claims.

Having thus described the invention, what I claim as new and desire to secure by Letters Patent is:—

1. A device for ornamenting confections, comprising a support adapted to receive the confections, a frame, means for mounting the frame and support for movement toward and away from each other, a second frame removably mounted in the first mentioned frame, screen stretched across the opening in said second frame, said screen having portions thereof covered to leave designs, said support having a graduated scale on the top supporting surface thereof, and a confection engaging member mounted above said support for movement thereacross and cooperating with said graduated scale for centering the confection with respect to the design in said screen, said first mentioned means including means for movably mounting said confection engaging member above said support, and for retaining said confection engaging member in a predetermined position.

2. In a device of the character described, two cooperating members, means for mounting said members in cooperating relation, said means including means for adjustably moving one of said members toward or away from the other of said members, one of said members adapted to support thereon an article to be ornamented, and the other of said members adapted to support thereon a design bearing stencil for disposition in operative relation with respect to the article to be ornamented, and a centering member movable at right angles to the direction of movement of said first mentioned movable member between said first referred to members for engagement with the article to be ornamented for centering the latter with respect to the design on said stencil, said first mentioned means including means for movably supporting said centering member, and for retaining said centering member in a predetermined adjusted position, and said one of said first mentioned members provided with a scale against which said centering device is adapted to be read.

In testimony whereof I affix my signature.

TONY BARBERA.